United States Patent
Takeda et al.

[11] Patent Number: 5,639,812
[45] Date of Patent: Jun. 17, 1997

[54] ALKENYLSUCCINIC ACID EMULSION SIZING AGENT (1)

[75] Inventors: Yasusuke Takeda; Sadao Kotsuka; Takeshi Kouchi, all of Kanagawa, Japan

[73] Assignee: Mitsubishi Oil Co., Ltd., Tokyo, Japan

[21] Appl. No.: 542,906

[22] Filed: Oct. 13, 1995

[30] Foreign Application Priority Data

Oct. 14, 1994 [JP] Japan ................................. 6-274261

[51] Int. Cl.$^6$ ................................................ C08K 5/092
[52] U.S. Cl. ........................ 524/272; 524/270; 524/271; 524/275; 524/112; 524/549
[58] Field of Search ............................. 524/487, 271, 524/272, 275, 112, 549, 270; 252/315.4

[56] References Cited

U.S. PATENT DOCUMENTS

| | | | |
|---|---|---|---|
| 4,514,544 | 4/1985 | Takahashi et al. | 525/327.4 |
| 5,219,912 | 6/1993 | Takahashi et al. | 524/321 |
| 5,306,757 | 4/1994 | Hatanaka et al. | 524/321 |
| 5,391,225 | 2/1995 | Shigeto et al. | 524/112 |

FOREIGN PATENT DOCUMENTS

| | | |
|---|---|---|
| 2108111 | 5/1983 | European Pat. Off. . |
| 0468280 | 1/1992 | European Pat. Off. . |

*Primary Examiner*—Paul R. Michl
*Assistant Examiner*—Olga Asinovsky
*Attorney, Agent, or Firm*—Sughrue, Mion, Zinn, Macpeak & Seas

[57] ABSTRACT

An alkenylsuccinic emulsion sizing agent comprising an active component comprising a mixture of (1) from 50 to 100 parts by weight of an alkenylsuccinic acid obtained by reacting a linear internal olefin having 10 to 14 carbon atoms with maleic anhydride; and (2) from 0 to 50 parts by weight of one or more components selected from the group consisting of rosin, rosin derivatives, tall oil, fatty acids, petroleum resins and paraffin wax; and wherein the active component is dispersed in water using an emulsifier and/or a high-molecular weight dispersion stabilizer.

7 Claims, No Drawings

ALKENYLSUCCINIC ACID EMULSION SIZING AGENT (1)

FIELD OF THE INVENTION

This invention relates to a sizing agent of the internal addition type which is used in the paper industry. More particularly, it relates to an alkenylsuccinic acid-series emulsion sizing agent produced from a product obtained by an addition reaction between a linear internal olefin and maleic anhydride. The sizing agent of the present invention has a high storage stability at a high concentration and imparts a good sizing performance to paper.

BACKGROUND OF THE INVENTION

Saponified (solution type) rosin sizing agents have been used for internal addition in a process for manufacturing paper under acidic conditions together with the use of aluminum sulfate. However, such a sizing agent exerts a poor sizing effect at a low addition level. Moreover, the sizing effect is further deteriorated due to an increase in water temperature accompanying the recent closed drainage system or within a range around neutral pH. In order to overcome the above-mentioned disadvantages of the saponified rosin sizing agents, emulsion type rosin sizing agents (JP-A-60-133052, JP-A-2-33393 and JP-B-2-53555, the term "JP-A" as used herein means an "unexamined published Japanese patent application", while the term "JP-B" as used herein means an "examined Japanese patent publication") and sizing agents obtained by the alkali-saponification of an alkenylsuccinic anhydride or an alkenylsuccinic acid (JP-A-58-214598) have been proposed. However, these sizing agents suffer from the problem that the sizing effects thereof are deteriorated in papermaking at a high temperature or within a range around neutral pH, similar to the saponified rosin sizing agents.

Regarding alkenylsuccinic anhydride emulsion sizing agents used mainly for neutral papermaking (U.S. Pat No. 3,821,069, JP-B-53-36044, JP-A-57-154495, JP-A-60-99098 and JP-B-4-53995), a method wherein an alkenylsuccinic anhydride containing an emulsifier is emulsified with a solution of cationic starch or water is known. In addition, methods wherein an alkenylsuccinic anhydride is emulsified by using an aqueous solution of an acrylamide-series polymer have recently been proposed (JP-A-2-47393 and JP-A-6-116894).

The reaction responsible for alkenylsuccinic anhydride sizing is as follows. Sizing is achieved by the anhydride group in the alkenylsuccinic anhydride molecule esterifying a fiber hydroxyl group of cellulose, i.e., the main component of pulp, and thus, introducing the substituent hydrophobic alkenyl group onto the fiber surface. Because of the higher reactivity of alkenylsuccinic anhydride, it is known to form an ester bond with the hydroxyl group of cellulose. In the conventional neutral papermaking process, it is therefore necessary that the alkenylsuccinic anhydride be added to a pulp slurry, in the form of the anhydride. However, the alkenylsuccinic anhydride is highly reactive with water. When the alkenylsuccinic anhydride is preliminarily emulsified and dispersed in water, therefore, it reacts with water within a short period of time. As a result, an acid anhydride group is converted into a carboxyl group which causes a loss in the function as a neutral sizing agent. During the process of the conversion of the acid anhydride group into the carboxyl group due to the reaction with water, the emulsion system is changed with aggregation, precipitation and separation occurring. Therefore, an emulsion sizing agent comprising an alkenylsuccinic anhydride for neutral papermaking in the form of an aqueous dispersion can be stored for only several hours. Accordingly, it cannot be supplied in the form of an emulsion product with a high concentration. This characteristic requires that it be emulsified and dispersed by using an emulsifier immediately before the papermaking.

It is also known that an alkenylsuccinic anhydride shows a lower esterification reactivity of the acid anhydride group under acidic conditions than under neutral or weakly alkaline conditions. When an emulsion of an alkenylsuccinic anhydride is used under acidic papermaking conditions (in particular, at a pH value of 5.0 or below) the sizing effect appears slowly, and only a poor sizing effect can be achieved immediately after the papermaking. If an alkenylsuccinic anhydride could be hydrolyzed into the corresponding alkenylsuccinic acid and then emulsified, the alkenylsuccinic acid would rapidly react with aluminum sulfate to thereby achieve a good sizing effect. Thus the above-mentioned problem in the reactivity of the conventional alkenylsuccinic anhydrides under acidic conditions might be solved. However an alkenylsuccinic acid can be hardly emulsified due to its highly hydrophilic nature. It is therefore difficult to obtain an emulsion which has a higher concentration than the conventional rosin emulsion sizing agent concentrations and which can remain stable over a long period.

As the results of recent studies, an emulsion sizing agent has been proposed wherein an alkenylsuccinic acid obtained by reacting a branched internal olefin with maleic anhydride is dispersed in water by using an anionic high-molecular weight dispersion stabilizer optionally together with an emulsifier (JP-A-5-140891). However it is very difficult to emulsify such an alkenylsuccinic acid obtained from a branched olefin and, therefore, it is necessary to use a highly emulsifiable substance together with it. On the other hand, an alkenylsuccinic acid, which is obtained from a product of a reaction between a linear internal olefin and maleic anhydride, can be easily emulsified, different from those obtained from branched olefins, but shows only a poor or no sizing effect (JP-A-6-128896).

SUMMARY OF THE INVENTION

An object of the present invention is to provide a novel alkenylsuccinic acid emulsion sizing agent which can be easily emulsified, exerts an excellent sizing effect at a high temperature and over a wide pH range even though it is added at a low addition level, and has a high storage stability at a high concentration.

Extensive studies have been conducted in order to solve the above-mentioned problems. As a result, it has been found that an emulsion sizing agent having a high storage stability at a high concentration can be produced by emulsifying an active component comprising at least 50 parts by weight of an alkenylsuccinic acid obtained by reacting a linear internal olefin having 10 to 14 carbon atoms with maleic anhydride, and further dispersing the product in water by using an emulsifier and/or a high-molecular weight dispersion stabilizer. This emulsion exhibits an outstanding and stable sizing effect, which cannot be achieved by the conventional saponified or emulsion sizing agents, even in a papermaking process of a low addition level, at a high temperature and over a wide pH range.

Accordingly, the present invention provides an alkenylsuccinic acid emulsion sizing agent wherein an active component, which comprises at least 50 parts by weight of an alkenylsuccinic acid obtained by reacting a linear internal olefin having 10 to 14 carbon atoms with maleic anhydride is dispersed in water using an emulsifier and/or a high-molecular weight dispersion stabilizer.

The present invention fundamentally differs from the existing techniques in that it provides a sizing agent comprising the hydrolyzate of an alkenylsuccinic anhydride obtained by reacting a linear internal olefin with maleic anhydride which has been generally considered as having only a poor sizing effect, and that the linear internal olefins having a relatively short carbon chain of 10 to 14 carbon atoms are exclusively employed.

DETAILED DESCRIPTION OF THE INVENTION

As the olefin having 10 to 14 carbon atoms, olefins prepared by isomerizing linear α-olefins by a known method, for example, the one described in JP-A-6-33598 may be used. An alkenylsuccinic acid obtained from an α-olefin has only a limited sizing effect. It is, therefore, preferable that the α-olefin remains in only a small amount in the isomerized internal olefin. It is preferable from the viewpoint of achieving a good sizing effect that the olefin used has 10 to 14 carbon atoms, more preferably from 12 to 14 carbon atoms. When the balance of the hydrophobic nature of the alkenyl group in the alkenylsuccinic acid molecule and the reactivity of the carboxyl group therein with aluminum sulfate is taken into consideration, an olefin having 9 or less carbon atoms is insufficient in the hydrophobic nature, while one having 16 or more carbon atoms has a lowered reactivity. Accordingly, an emulsion of an alkenylsuccinic acid obtained from an olefin having more than 16 carbon atoms or less than 9 carbon atoms achieves less sizing effect.

An internal olefin obtained by the isomerization is reacted with maleic anhydride by a known method (for example, the one described in JP-B-4-37199) to give the corresponding alkenylsuccinic anhydride. Then it is reacted with an equimolar amount of water to give an alkenylsuccinic acid which is usable in the production of an emulsion sizing agent.

In the present invention, an emulsion which has a high stability and exhibits an excellent sizing effect can be obtained by emulsifying an alkenylsuccinic acid alone by using an emulsifier and/or an anionic high-molecular weight dispersion stabilizer. However, an emulsion which has an improved stability, a fine texture and a better sizing effect can be obtained by blending a hydrocarbon resin free from any acid group to thereby improve the emulsification properties and the stability of the emulsion. The hydrocarbon resin free from any acid group is preferably liquid. Examples of the hydrocarbon resin to be used include aromatic methylene resins, aromatic formaldehyde resins having an aromatic ring bound via methylene, ether, acetal or methylol groups and oligomers of 1,3-pentadiene. Such a hydrocarbon resin is blended in an amount of from 0 to 50 parts by weight per 50 to 100 parts by weight of the alkenylsuccinic acid, preferably from 5 to 20 parts by weight per 80 to 95 parts by weight of the alkenylsuccinic acid.

Examples of the emulsifier to be used in the present invention include (A) anionic surfactants such as alkylbenzenesulfonic acid salts; sulfate salts, phosphates and phosphate salts of polyoxyethylene alkyl ethers; sulfate salts, phosphates and phosphate salts of polyoxyethylene alkyl phenyl ethers; sulfate salts, phosphates and phosphate salts of polyoxyethylene aralkyl phenyl ethers; and alkyl ether sulfate salts and (B) nonionic surfactants such as polyoxyethylene alkyl ethers, polyoxyethylene alkyl phenyl ethers, polyoxyethylene aralkyl phenyl ethers, sorbitan fatty acid esters and polyoxyethylene sorbitan fatty acid esters.

As the high-molecular weight dispersion stabilizer, anionic substances comprising a partial or complete saponification product (i.e., 60 to 100% saponification) of a polymer or a copolymer comprising from 5 to 95 parts by weight of a component (C) which is a monomer constituting a hydrophilic group and from 5 to 95 parts by weight of a component (D) which is a monomer constituting a hydrophobic group can be used. As the component (C), acrylic acid, methacrylic acid, maleic acid, maleic anhydride, itaconic acid and fumaric acid can be used, while as the component (D), styrene-series monomers (for example, styrene, α-methylstyrene) and acrylates and methacrylates (for example, methyl acrylate, methyl methacrylate, ethyl acrylate, ethyl methacrylate, butyl acrylate, butyl methacrylate) can be used. Any of these substances or a mixture thereof may be used in the present invention.

If desired, the alkenylsuccinic acid-series emulsion sizing agent of the present invention may further contain other active components such as other resinous materials (for example, rosin, a product of a reaction between rosin and an α,β-unsaturated polybasic acid, denatured rosin such as disproportionated rosin, rosin polymer, hydrogenated rosin or a product of a reaction between rosin and formaldehyde), fatty acids, tall oil, paraffin wax and petroleum resins. It is preferable that the content of the alkenylsuccinic acid in the active component composition amounts to 50 parts by weight or more. It is not preferable that the content of resinous materials other than the alkenylsuccinic acid exceeds 50 parts by weight in the composition since the sizing effect is deteriorated thereby.

The content of the emulsifier and/or the high-molecular weight dispersion stabilizer ranges from 1 to 20 parts by weight, preferably from 1 to 10 parts by weight, per 100 parts by weight of the total weight of the alkenylsuccinic acid, optionally together with the resinous material(s) blended therewith (i.e., hydrocarbon resin free from any acid residue, rosin, etc.).

The sizing agent of the present invention can be produced by any known emulsification method, for example, one which comprises mixing the active components, namely, the alkenylsuccinic acid optionally together with the resinous material(s) blended therewith (i.e., hydrocarbon resin free from any acid residue, rosin, etc.) under heating to give a molten mixture and subjecting the resulting mixture to reversal emulsification or treating the same with a homogenizer. An alkenylsuccinic acid emulsion having a particularly fine texture and a high stability can be obtained by using a high-pressure emulsifier. In this case, the above-mentioned active components are mixed under heating to thereby give a molten mixture, then pre-emulsified by adding hot water and an emulsifier and/or a high-molecular weight dispersion stabilizer thereto and then emulsified with the use of the high-pressure emulsifier.

The sizing agent according to the present invention can be added to pulp slurry at an arbitrary point prior to the completion of the papermaking process, similar to the conventional rosin-series sizing agents. For example, aluminum sulfate may be added before or after adding the sizing agent of the present invention to a pulp slurry during or after the beating step to thereby regulate the slurry to pH 4.0 to 7.0 for the fixation of the sizing agent to the pulp. It is also possible to use the sizing agent of the present invention together with another sizing agent (for example, a conventional rosin-series sizing agent, petroleum resin sizing agent) at an arbitrary ratio.

In the case of the internal-addition sizing, the sizing agent of the present invention may be used (added) at a ratio of from 0.01 to 5.0% by weight, preferably from 0.05 to 3.0% by weight, based on the weight of dry pulp.

EXAMPLES

To further illustrate the present invention in greater detail, and not to be taken as limiting, the following Examples will be given. Unless otherwise indicated, all parts, percents, ratios and the like are by weight.

<Isomerization of α-Olefin>

Referential Example 1

Into a 2 l glass flask were fed 762 g of n-dodecene-1 and 1.02 g of nickel octanoate (molar concentration of the nickel based on olefin: 600 ppm). After purging the flask with helium, 3.3 g of ethyl aluminum sesquichloride (4.5 times by mol as much as nickel) was added thereto and the obtained mixture was reacted at 30° C. for about 2 hours. Next, the catalyst was decomposed by adding a 1N aqueous solution of sodium hydroxide and removed. Thus 720 g of an internal olefin having 12 carbon atoms was obtained. When examined by $^{13}$C-NMR, less than 1% of n-dodecene-1 remained in this internal olefin.

Referential Example 2 n-Tetradecene-1 was isomerized under the same conditions as those described in the above Referential Example 1 to thereby give an internal olefin having 14 carbon atoms. When examined by $^{13}$C-NMR, less than 1% of n-tetradecene-1 remained in this internal olefin.

Referential Example 3

An α-olefin having 13 carbon atoms on average, which had been obtained by polymerizing ethylene, was isomerized under the same conditions as those described in the above Referential Example 1 to thereby give an internal olefin having 13 carbon atoms on average. When examined by $^{13}$C-NMR, less than 1% of the α-olefin remained in this internal olefin.

Referential Example 4

An α-olefin having 16 carbon atoms on average, which had been obtained by polymerizing ethylene, was isomerized under the same conditions as those described in the above Referential Example 1 to thereby give an internal olefin having 16 carbon atoms on average. When examined by $^{13}$C-NMR, less than 1% of the α-olefin remained in this internal olefin.

<Preparation of High-Molecular Weight Dispersion Stabilizer>

Referential Example 5

Into a 11 l glass flask were fed 60 g of acrylic acid, 10 g of stearyl methacrylate, 30 g of butyl acrylate, 0.1 g of 2-mercaptoethanol, 566 g of water and 5 g of a commercially available sulfate-series surfactant (Hitenol™ NF-13, manufactured by Dai-ichi Kogyo Seiyaku, Co., Ltd.). The mixture was heated to 70° C. under stirring. Then 50 g of a 1% aqueous solution of ammonium peroxodisulfate was slowly dropped into this mixture. After the completion of the addition, the reaction mixture was allowed to react at 80° C. for 2 hours and cooled to thereby give an acrylic acid-series copolymer having a milky white color.

Referential Example 6

To completely saponify the carboxyl group moiety originating in acrylic acid of the acrylic acid-series copolymer obtained in the above Referential Example 5, 167 g of a 20% aqueous solution of sodium hydroxide was added thereto and the mixture was stirred at 40° C. for 1 hour. Thus a saponified product of the acrylic acid-series copolymer was obtained. This high-molecular weight dispersion stabilizer was in the form of a viscous liquid in a pale pink color which contained 15% by weight of solid matters and had a viscosity of 8,000 cps.

Referential Example 7

60% of the acid group moiety of the acrylic acid-series copolymer obtained by the above Referential Example 5 was saponified by the same method as the one of Referential Example 6 to thereby give a high-molecular weight dispersion stabilizer having a milky white color which contained 14% by weight of solid matters and had a viscosity of 12,000 cps.

Example 1

The isomerized dodecene of the above Referential Example 1 was then subjected to an addition reaction with maleic anhydride to thereby produce dodecenylsuccinic anhydride. This compound was reacted with an equimolar amount of water to thereby prepare dodecenylsuccinic acid. To 142 g of this dodecenylsuccinic acid was added 8 g of a 1,3-pentadiene oligomer (Maruka Clear R-oil, manufactured by Maruzen Oil Chemistry Co., Ltd.). After heating to 90° C., 10 g of the high-molecular weight dispersion stabilizer synthesized in Referential Example 6 and 273 g of water were further added thereto and then mixed while maintaining the mixture at 90° C. The emulsified product thus obtained was further stirred in a homomixer (Model TK, manufactured by Tokushu Kika Kogyo K.K.) at 10,000 rpm for 2 minutes. Thus, an oil-in-water type emulsion of a total solid concentration of 35% by weight was prepared.

Example 2

The isomerized dodecene of the above Referential Example 1 was subjected to an addition reaction with maleic anhydride to thereby give dodecenylsuccinic anhydride. Then this compound was converted into dodecenylsuccinic acid in the same manner as the one of Example 1. To 120 g of this dodecenylsuccinic acid was added 30 g of a 1,3-pentadiene oligomer (Maruka Clear R-oil, manufactured by Maruzen Oil Chemistry Co., Ltd.). After heating to 90° C., 30 g of the high-molecular weight dispersion stabilizer synthesized in Referential Example 6 and 262 g of water were further added thereto and then mixed while maintaining the mixture at 90° C. Next, the emulsified product thus obtained was homogenized by passing twice through a piston high-pressure emulsifier (manufactured by APV-GAULIN) under a pressure of 400 kg/cm² and then rapidly cooled to room temperature. Thus an oil-in-water type emulsion having a total solid concentration of 35% by weight was prepared.

Example 3

The isomerized tetradecene of the above Referential Example 2 was subjected to an addition reaction with maleic anhydride to thereby give tetradecenylsuccinic anhydride. Then this compound was converted into tetradecenylsuccinic acid in the same manner as the one of Example 1. To 120 g of this tetradecenylsuccinic acid was added 30 g of a 1,3-pentadiene oligomer (Maruka Clear R-oil, manufactured by Maruzen Oil Chemistry Co., Ltd.). After heating to 90° C., 32 g of the high-molecular weight dispersion stabilizer synthesized in Referential Example 7 and 260 g of water were further added thereto and then mixed while maintaining the mixture at 90° C. Subsequently, the procedure of Example 2 was repeated. Thus, an oil-in-water type emulsion of a total solid concentration of 35% by weight was prepared.

Example 4

The linear internal olefin having 13 carbon atoms on average obtained in the above Referential Example 3 was subjected to an addition reaction with maleic anhydride to thereby produce an alkenylsuccinic anhydride. Then this compound was converted into an alkenylsuccinic acid in the same manner as the one of Example 1. To 142 g of this alkenylsuccinic acid was added 8 g of a 1,3-pentadiene oligomer (Maruka Clear R-oil, manufactured by Maruzen Oil Chemistry Co., Ltd.). After heating to 90° C., 10 g of the high-molecular weight dispersion stabilizer synthesized in Referential Example 6, 1.5 g of a commercially available sulfate-series surfactant (Hitenol™ 18, manufactured by Daiichi Kogyo Seiyaku, Co., Ltd.) and 276 g of water were further added thereto and then mixed while maintaining the mixture at 90° C. Subsequently, the procedure of Example 2 was repeated. Thus an oil-in-water type emulsion of a total solid concentration of 35% by weight was prepared.

Example 5

The linear internal olefin having 13 carbon atoms on average obtained in the above Referential Example 3 was subjected to an addition reaction with maleic anhydride to thereby produce an alkenylsuccinic anhydride. Then this compound was converted into an alkenylsuccinic acid in the same manner as the one of Example 1. 99 g of this alkenylsuccinic acid was mixed with 43 g of fumaric rosin and 8 g of a 1,3-pentadiene oligomer (Maruka Clear R-oil, manufactured by Maruzen Oil Chemistry Co., Ltd.) in a molten state at 90° C. Further, 50 g of the high-molecular weight dispersion stabilizer synthesized in Referential Example 6 and 250 g of water were added thereto and then mixed while maintaining the mixture at 90° C. Subsequently, the procedure of Example 2 was repeated. Thus an oil-in-water type emulsion of a total solid concentration of 35% by weight was prepared.

Comparative Example 1

The linear internal olefin having 16 carbon atoms on average obtained in the above Referential Example 4 was subjected to an addition reaction with maleic anhydride to thereby produce an alkenylsuccinic anhydride. To 100 g of this compound was added 5 g of polyoxyethylene (polymerization degree: 13) nonyl phenyl ether and thoroughly stirred at 50° C. 1 g of this mixture was mixed with 99 g of water and emulsified by stirring in a homomixer at 10.000 rpm for 1 minute. Thus an oil-in-water type emulsion of a total solid concentration of 1% by weight was obtained.

Comparative Example 2

A linear internal olefin obtained by isomerizing n-hexadecene-1 under the same conditions as those of the above Referential Example 1 was subjected to an addition reaction with maleic anhydride to thereby produce hexadecenylsuccinic anhydride. Then this compound was reacted with an equimolar amount of water to thereby produce hexadecenylsuccinic acid. To 142 g of this hexadecenylsuccinic acid was added 8 g of a 1,3-pentadiene oligomer (Maruka Clear R-oil, manufactured by Maruzen Oil Chemistry Co., Ltd.). After heating to 90° C., 10 g of the high-molecular weight dispersion stabilizer synthesized in Referential Example 6 and 273 g of water were further added thereto and then mixed while maintaining the mixture at 90° C. Subsequently, the procedure of Example 2 was repeated. Thus an oil-in-water type emulsion of a total solid concentration of 35% by weight was prepared.

Comparative Example 3 n-Dodecene-1 was subjected to an addition reaction with maleic anhydride to thereby produce dodecenylsuccinic anhydride. Then this compound was reacted with an equimolar amount of water to thereby give dodecenylsuccinic acid. To 142 g of this dodecenylsuccinic acid was added 8 g of a 1,3-pentadiene oligomer (Maruka Clear R-oil, manufactured by Maruzen Oil Chemistry Co., Ltd.). After heating to 90° C., 10 g of the high-molecular weight dispersion stabilizer synthesized in Referential Example 6 and 273 g of water were further added thereto and then mixed while maintaining the mixture at 90° C. Subsequently, the procedure of Example 2 was repeated. Thus an oil-in-water type emulsion of a total solid concentration of 35% by weight was prepared.

Comparative Example 4

A propylene oligomer having an average of 12 carbon atoms was subjected to an addition reaction with maleic anhydride to thereby produce an alkenylsuccinic anhydride. To 60 g of this alkenylsuccinic anhydride was added an aqueous solution comprising 26 g of potassium hydroxide and 126 g of water. The obtained mixture was stirred while maintaining a temperature of 90 to 100° C. Then it was cooled to room temperature over 3 hours. Thus, a saponified alkenylsuccinic acid sizing agent having a total solid concentration of 40% by weight was obtained.

Comparative Example 5

A commercially available emulsion type rosin-series sizing agent (OT-500J™, manufactured by Dick Hercules K.K.) which had a solid concentration of 50% prepared by emulsifying a rosin-series resin comprising fumaric rosin as the main component with a high-molecular weight dispersion stabilizer was used.

Comparative Example 6

A commercially available saponified rosin-series sizing agent (PF Size 800L™, manufactured by Misawa Ceramic Chemical) which had a solid concentration of 50% and was prepared by saponifying a rosin-series resin comprising maleic rosin as the main component with the use of caustic potash was used.

<Storage Stability Test>

25 g portions of the alkenylsuccinic acid-series emulsion sizing agents prepared by the methods described in the above Examples 1 to 5, the commercially available sizing agent of Comparative Example 5 and the alkenylsuccinic acid-series emulsion sizing agents prepared in Comparative Examples 1 and 2 were each sampled in a 50 ml glass vial and allowed to stand at room temperature (25° C.). Then the stability of each sample was observed with the naked eye 1, 7 and 60 days thereafter. A sample with a poor stability underwent the separation of an oily matter on the bottom of the vial or in the upper part of the liquid. The products of Comparative Examples 4 and 6 were not subjected to this storage stability test, since they were not emulsion type sizing agents but saponified ones.

Table 1 shows the results.

TABLE 1

Result of Storage Stability Test

Storage time (days)

| | 1 | 7 | 60 |
|---|---|---|---|
| Ex. 1 | no precipitate | trace precipitate | trace precipitate |
| 2 | no precipitate | no precipitate | no precipitate |
| 3 | no precipitate | no precipitate | no precipitate |
| 4 | no precipitate | no precipitate | no precipitate |
| 5 | no precipitate | no precipitate | trace precipitate |
| C. Ex. 1 | trace precipitate | much precipitate | much precipitate |
| 2 | no precipitate | no precipitate | no precipitate |
| 3 | no precipitate | trace precipitate | trace precipitate |
| 4 | — | — | — |
| 5 | no precipitate | no precipitate | trace precipitate |
| 6 | — | — | — |

<Mechanical Stability Test>

The alkenylsuccinic acid-series emulsion sizing agents prepared by the methods described in the above Examples 1 to 5, the commercially available sizing agent of Comparative Example 5 and the alkenylsuccinic acid-series emulsion sizing agents prepared in Comparative Examples 1 and 2 were subjected to a mechanical stability test in accordance with the method of JISK-6387. Thus, 50 g of each sizing agent diluted to a concentration of 10% was introduced into a device specified in JISK-6387 (Merlon test machine) and tested under a load of 10 kg at 1,000 rpm for 30 minutes and the formation of sludge was observed with the naked eye. The products of Comparative Examples 4 and 6 were not subjected to this mechanical stability test, since they were not emulsion type sizing agents but saponified ones.

Table 2 shows the results.

TABLE 2

Results of Mechanical Stability Test

| | Sludge formation |
|---|---|
| Ex. 1 | no precipitate |
| 2 | no precipitate |
| 3 | no precipitate |
| 4 | no precipitate |
| 5 | trace precipitate |
| C. Ex. 1 | no precipitate |
| 2 | no precipitate |
| 3 | no precipitate |
| 4 | — |
| 5 | much precipitate |
| 6 | — |

<Sizing Effect Determination Test>

A bleached kraft pulp was diluted with tap water to give a pulp concentration of 2.5% and then beaten with a beater to give a Canadian freeness of about 450 ml. Next, the pulp slurry thus obtained was diluted with tap water at 40° C. to give a 2.0% by weight slurry. Then aluminum sulfate (1.0% by weight based on the pulp) was added thereto under stirring. After diluting the slurry with water (pH 4.0, 40° C.) to give a concentration of 0.5% by weight, each of the sizing agents of Examples 1 to 5 and Comparative Examples 1 to 6 (0.3% by weight based on the pulp) was added. Each slurry was subjected to papermaking with a TAPPI standard machine (paper weight: 60 g/m2). The wet paper thus obtained was pressed in a conventional manner and then dried. The paper thus obtained was subjected to moisture conditioning for a day in a thermo-hygrostatic room (20° C., RH: 65%). Then the sizing effect was determined by the Stöckigt sizing degree determination method in accordance with JIS P 8122. For effecting a papermaking test in a higher pH value region, a small amount of a dilute aqueous solution of sodium hydroxide was added, after the addition of a definite amount of aluminum sulfate, to thereby regulate the slurry to pH 5.5 and the water for dilution and the papermaking water were also regulated to pH 5.5. The papers thus produced were evaluated in the same manner.

Table 3 shows the results.

TABLE 3

Results of Sizing Effect Determination Test

Stöckigt sizing degree (sec.)

| | pH 4.0 | pH 5.5 |
|---|---|---|
| Ex. 1 | 14 | 22 |
| 2 | 20 | 24 |
| 3 | 17 | 27 |
| 4 | 14 | 28 |
| 5 | 16 | 22 |
| C. Ex. 1 | 13 | 30 |
| 2 | 2 | 2 |
| 3 | 3 | 4 |
| 4 | 10 | 6 |
| 5 | 22 | 8 |
| 6 | 5 | 5 |

Compared with the conventional emulsion sizing agents of alkenylsuccinic anhydrides, the alkenylsuccinic acid-series emulsion sizing agent according to the present invention has a high storage stability at a high concentration and exhibits an excellent sizing effect immediately after the papermaking. Compared with the saponified alkenylsuccinic acid-series sizing agents, moreover, it exerts a stable sizing effect over a wide pH range even in high-temperature papermaking.

While the invention has been described in detail and with reference to specific example thereof, it will be apparent to one skilled in the art that various changes and modifications can be made therein without departing from the spirit and scope thereof.

What is claimed is:

1. An alkenylsuccinic emulsion sizing agent comprising an active component comprising a mixture of
   (1) from 50 to 100 parts by weight of an alkenylsuccinic acid obtained by reacting a linear internal olefin having 10 to 14 carbon atoms with maleic anhydride; and
   (2) from 0 to 50 parts by weight of one or more components selected from the group consisting of rosin, rosin derivatives, tall oil, fatty acids, petroleum resins and paraffin wax; and
wherein said active component is dispersed in water using an emulsifier and/or a high-molecular weight dispersion stabilizer.

2. An alkenylsuccinic acid emulsion sizing agent with a solids concentration of at least 30% by weight, which comprises an active component comprising a mixture of
   (1) from 80 to 95 parts by weight of an alkenylsuccinic acid obtained by reacting a linear internal olefin having 12 to 14 carbon atoms with maleic anhydride; and
   (2) from 5 to 20 parts by weight of one or more components selected from the group consisting of petroleum resins free from an acid group;

wherein said active component is dispersed in water by using a high-molecular weight dispersion stabilizer or a mixed system of a high-molecular weight dispersion stabilizer with an emulsifier.

3. The alkenylsuccinic acid emulsion sizing agent as claimed in claim 2, wherein the petroleum resins free from an acid group are liquid.

4. The alkenylsuccinic acid emulsion sizing agent as claimed in claim 1, wherein said emulsifier is at least one emulsifier selected from the group consisting of:

(A) an anionic surfactant selected from the group consisting of alkylbenzenesulfonic acid salts; sulfate salts, phosphates and phosphate salts of polyoxyethylene alkyl ethers; sulfate salts, phosphates and phosphate salts of polyoxyethylene alkyl phenyl ethers; sulfate salts, phosphates and phosphate salts of polyoxyethylene aralkyl phenyl ethers; and alkyl ether sulfate salts; and (B) an nonionic surfactant selected from the group consisting of polyoxyethylene alkyl ethers, polyoxyethylene alkyl phenyl ethers, polyoxyethylene aralkyl phenyl ethers, sorbitan fatty acid esters and polyoxyethylene sorbitan fatty acid esters.

5. The alkenylsuccinic acid emulsion sizing agent as claimed in claim 2, wherein said emulsifier is at least one emulsifier selected from the group consisting of:

(A) an anionic surfactant selected from the group consisting of alkylbenzenesulfonic acid salts; sulfate salts, phosphates and phosphate salts of polyoxyethylene alkyl ethers; sulfate salts, phosphates and phosphate salts of polyoxyethylene alkyl phenyl ethers; sulfate salts, phosphates and phosphate salts of polyoxyethylene aralkyl phenyl ethers; and alkyl ether sulfate salts; and (B) an nonionic surfactant selected from the group consisting of polyoxyethylene alkyl ethers, polyoxyethylene alkyl phenyl ethers, polyoxyethylene aralkyl phenyl ethers, sorbitan fatty acid esters and polyoxyethylene sorbitan fatty acid esters.

6. The alkenylsuccinic acid emulsion sizing agent as claimed in claim 1, wherein said high-molecular weight dispersion stabilizer is a partial or complete saponification product of a polymer or a copolymer comprising:

(C) from 5 to 95 parts by weight of one or more anionic unsaturated monomers selected from the group consisting of acrylic acid, methacrylic acid, maleic acid, maleic anhydride, itaconic acid and fumaric acid; and (D) from 5 to 95 parts by weight of one or more nonionic unsaturated monomers selected from the group consisting of styrene monomers, acrylate monomers and methacrylate monomers.

7. The alkenylsuccinic acid emulsion sizing agent as claimed in claim 2, wherein said high-molecular weight dispersion stabilizer is a partial or complete saponification product of a polymer or a copolymer comprising:

(C) from 5 to 95 parts by weight of one or more anionic unsaturated monomers selected from the group consisting of acrylic acid, methacrylic acid, maleic acid, maleic anhydride, itaconic acid and fumaric acid; and (D) from 5 to 95 parts by weight of one or more nonionic unsaturated monomers selected from the group consisting of styrene monomers, acrylate monomers and methacrylate monomers.

* * * * *